Patented Apr. 20, 1954

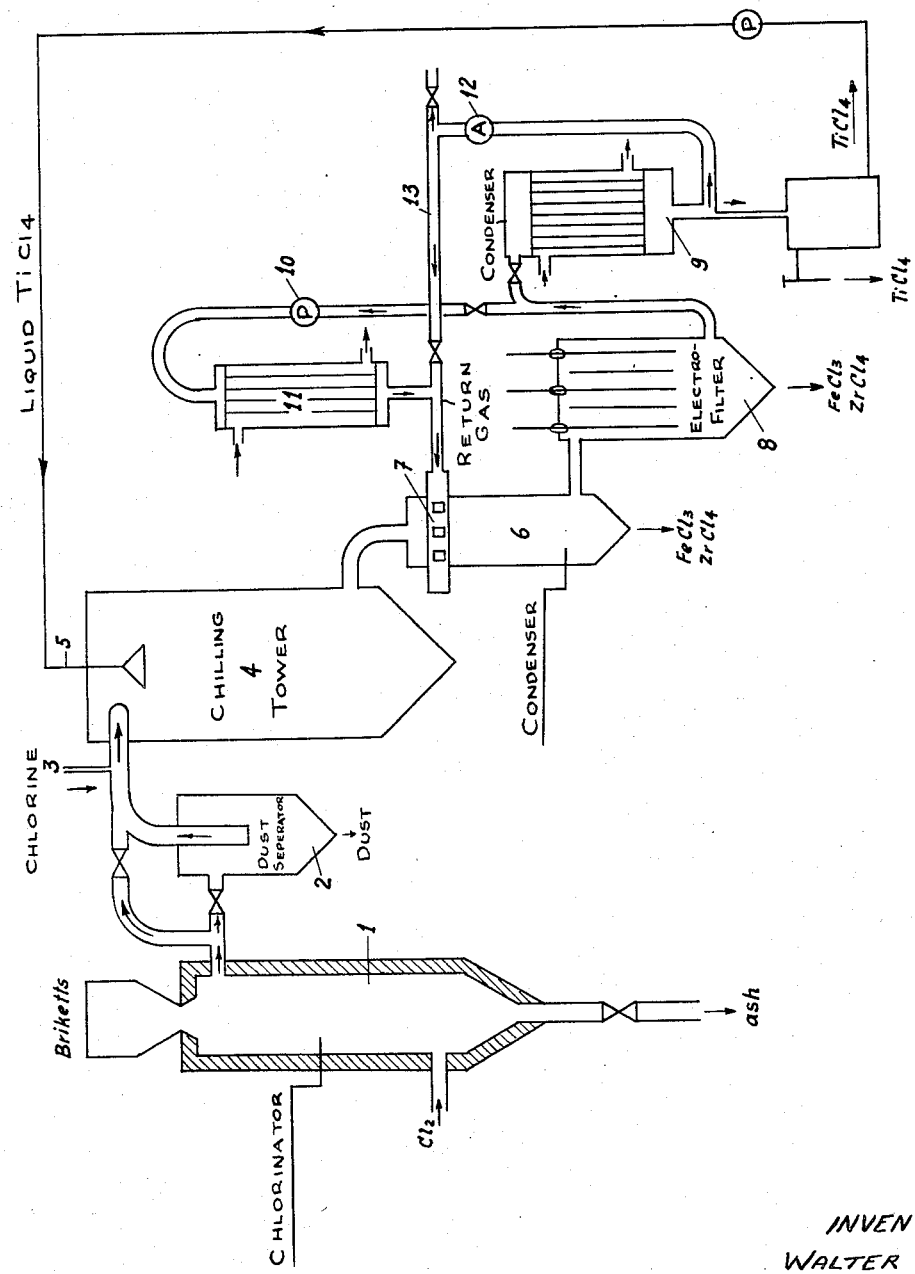

2,675,891

UNITED STATES PATENT OFFICE 2,675,891

PROCESS FOR THE SEPARATION OF METAL CHLORIDES FROM CHLORINATION GASES

Walter Frey, Basel, Switzerland, assignor to Saurefabrik Schweizerhall, Schweizerhalle, Switzerland, a corporation of Switzerland Application May 4, 1951, Serial No. 224,527

Claims priority, application Switzerland April 1, 1949

7 Claims. (Cl. 183—120)

The present invention relates to certain improvements in or relating to a process for separately recovering metal chlorides, such as ferric chloride and titanium tetrachloride, from gaseous mixtures such as obtained by the chlorination of titanium containing raw materials; such as, natural titanium ores like rutile, ilmenite, etc. or titanium oxide containing slags as obtained, e. g., when recovering metallic iron from ilmenite by a reduction process.

These raw materials always contain in addition to titanium oxide substantial amounts of other metal oxides and of silicon oxides.

Rutile, e. g., may contain, besides 90–96% $TiO_2$, from 1 to several percents of iron oxide, zirconium oxide, aluminum oxide and silicon oxide. Minor amounts of chromic oxide, columbium oxide and vanadium pentoxide are also present. Ilmenite may contain 40 to 60% $TiO_2$, large amounts of iron oxide (50 to 30%), lower amounts of the oxides of aluminum, silicon, chromium, vanadium and small amounts of the oxides of columbium (niobium), zirconium and the rare earths.

Ilmenite-slag is obtained by reducing ilmenite with carbon to recover metallic iron by a process wherein various amounts of oxides of magnesium, calcium and aluminum may be added to lower the melting point of the slag. It contains 60 to 70% of titanium oxide, yet up to 10% of iron oxide, several percents (even up to 15% of each) of the added oxides of aluminum, magnesium and calcium and varying amounts of the oxides of vanadium, silicon, columbium, zirconium, etc.

This invention, however, is not restricted to the chlorination of the above three materials but relates also to the chlorination of mixtures of these materials or the chlorination of still other titanium containing materials say, for example, ilmeno-rutile.

The chlorination of these materials is performed in the presence of reducing agents, for example, carbonaceous reducing materials, such as coke, coal and charcoal and like carbon-containing materials. The finely divided raw material may be briquetted with pulverized carbon and coal tar or pitch before chlorination, or a suspension of the mixture of pulverized titanium material and pulverized carbon in chlorine gas may be used. As is known, the chlorination process proceeds at temperatures between 500° C. and 1500° C. preferably between 700° C. and 1000° C. or 600° C. and 900° C. The gases produced during chlorination contain, in addition to gases which do not condense under normal conditions, such as carbon monoxide, carbon dioxide, hydrochloric acid gas, chlorine and the like, the volatile metallic chlorides which have been formed. Part of these chlorides condense in liquid form, such as titanium tetrachloride and silicon chloride, while others may separate out as solids, such as chlorides of iron, aluminum, zirconium, chromium and columbium.

These different chlorides have, of course, different condensation temperatures. The sublimation and boiling points at normal pressure cover a large range of temperatures; ferrous chloride, e. g., condenses at about 1020° C., whereas, silicon tetrachloride condenses at 57° C. Due to the presence of large quantities of gases the chlorides do not condense at a fixed temperature but rather over a range of temperatures. Theoretically this condensation range has no definite lower temperature limit. It will be understood that the temperature range within which 99% of a chloride is condensed will be taken hereinafter as the temperature range for the condensation of the chloride. The upper limit of the condensation range, that is, the temperature at which the condensation starts (e. g. the condensation point of the normally solid chlorides) depends on the partial pressure the particular chloride exerts in the gaseous mixture.

In spite of the different condensation ranges the recovery or separation of the chlorides contained in the chlorination gases has proven very difficult. A separation, and preferably a separate recovery of the chlorides, however, is important for their industrial utilization.

The general procedure to be followed when separating at least part of the normally solid metal chlorides, such as the chlorides of iron, zirconium and the like from the normally liquid metal chlorides involves cooling the gaseous products of the chlorination to somewhat above the dew point of the liquid metal chlorides such as titanium tetrachloride thereby condensing the solid metallic chlorides and then removing the condensed solid metal chlorides from the gas. It is known that the cooling of the condensation gases and the separation of the metal chlorides gives rise to considerable practical difficulties. The efficient separation of the solid ferric chloride is especially difficult for this compound precipitates at temperatures of 200–300° C. depending upon the composition of the chlorination gases. Ferric chloride shows a strong tendency to condense directly on the walls of the condenser and form large crystals thereon which frequently cause incrustation and clogging of the apparatus especially when the apparatus is indirectly cooled to effect condensation.

When working on a large scale, however, it has been found that similar difficulties occur at a temperature above the condensation range for ferric chloride, i. e. at temperatures in the range between the discharge temperature of the chlorination gases and the condensation temperature of ferric chloride, say 800–300° C. For example, even those parts of the apparatus which only serve for cooling the chlorination gases down to the precipitation range of the ferric chloride are clogged after some time of operation due to the formation of precipitates and incrustations.

In order to overcome the difficulties which occur during the condensation and separation of normally solid metal chlorides such as ferric chloride, different methods have been proposed. For instance, it has been proposed to condense and separate the ferric chloride together with the titanium tetrachloride by washing the hot gases with cold liquid titanium tetrachloride. This method provides a suspension of ferric chloride in titanium tetrachloride. The separate recovery of ferric chloride and liquid titanium tetrachloride therefore is not achieved.

It has further been suggested to cool the reaction gas first to a temperature not lower than slightly above the precipitation point of the ferric chloride and then inject into the gas liquid, such as a liquid metal halogenide, especially titanium tetrachloride. The amount of the chloride to be injected should be regulated in such a manner that the ferric chloride is condensed to a great part while at the same time the entire amount of the injected liquid titanium tetrachloride is evaporated. Subsequently the ferric chloride can be removed in a dry state from the gas. By this process the ferric chloride is precipitated as a finely divided suspension in the gas and is thereby prevented from adhering to the walls of the apparatus. Safe working, however, according to this known process on an industrial scale depends to a large extent upon a very exact regulation of the amount of the liquid injected and on its temperature. This regulation must continuously be adapted to the composition of the ore, the chlorination method, and to the reaction temperature of the chlorinating process since the conditions under which the various chlorides precipitate depend to a large extent upon these factors. Furthermore complete evaporation of the liquid, for instance, titanium tetrachloride, together with a substantially complete separation of the solid metal chloride can hardly be achieved at a temperature only slightly above the dew point of said chloride. The possibility that the liquid chloride is also precipitated together with the solid metal chloride or that the precipitation of the solid chloride does not take place completely, is very great especially when cooling chlorination gases derived from ores containing small amounts of normally solid metal chlorides especially such as chlorides of iron or zirconium. If the conditions under which precipitation of these normally solid metal chlorides takes place are not observed exactly there immediately occur disturbances within the apparatus, such as incrustations, cloggings, formations of contaminating smears and the like.

It is an object of this invention to separate normally solid metal chlorides from gaseous mixtures in a physical form which facilitates their easy removal from the gas stream.

It is another object of this invention to separate in an undissociated state, from gaseous metal chloride mixtures, normally solid metal halides which are unstable and tend to dissociate into less volatile halides in the course of separation.

Yet another object of the invention is to effect the efficient separation of normally solid metal chlorides free of contamination with normally liquid metal chlorides, followed by separation of normally liquid chlorides free of solid particles, from gaseous mixtures of both normally solid and normally liquid metal chlorides.

A special object of this invention is to recover ferric chloride from gaseous mixtures obtained by the chlorination of titaniferous materials.

Still another object of this invention is the prevention of the formation of incrustations and the clogging of apparatus during the cooling of chlorination gases over temperature ranges above the dew points of the normally solid metal chlorides present in the chlorination gases derived from metalliferous materials.

Other objects, purposes and advantages of the invention will be apparent from the more detailed description which follows.

The problems solved and the objects achieved by the process of this invention may be illustrated by the separation of ferric chloride from the chlorination gases of titaniferous materials such as defined hereinbefore.

Now, it has been found that the precipitates and incrustations which cause difficulties in the known processes of chlorination gas treatment consist mainly of ferrous chloride. It has been found that when chlorinating ores which contain less than 20 to 10% of FeO, the ferrous chloride does not originate directly from the chlorination zone but is formed only after the gases have left this zone, by the dissociation of volatilized ferric chloride. This dissociation of volatile ferric chloride to ferrous chloride may take place over the whole temperature range of 800–300° C. The temperature at which it starts and the temperature range in which most of the ferric chloride is dissociated or convertible into ferrous chloride depends very much on the concentration. The temperature dependence of the dissociation will readily be understood from the equilibrium constants of the dissociation reaction, i. e.

$$2FeCl_3 \text{ vapor} \rightleftarrows 2FeCl_2 \text{ solid} + Cl_2$$

The constant $$\frac{(pFeCl_3)^2}{pCl_2} = K_p$$

has a value of about 100 at 1000° C. but only 0.1 at about 500° C. The same chlorine concentration therefore can keep at 1000° C. about 30 times more FeCl₃ in a vaporous state than at 500° C. A very small concentration of chlorine, e. g. 0.01%, which is always present in the chlorination gases, therefore can keep in vaporous form at 1000° C. about 10% by volume of FeCl₃, but at 500° C. only 0.3% by volume.

The dissociation of ferric chloride does not take place in the reduced temperature range wherein the ferric chloride condenses, due no doubt to the higher thermodynamic stability of the solid ferric chloride and also due to the fact that the rate of dissociation at temperatures below 400–300° C. becomes very slow.

An efficient process for the separation of metal chlorides from the chlorination gases is provided by this invention on the basis of the discoveries above indicated and others set forth hereinbelow.

This process encompasses two steps. In the first step the gases are chilled to a temperature at which a dissociation of ferric chloride into ferrous chloride takes place only very slowly or not at all. It has been found that this temperature is still higher than the condensation point of the ferric chloride but depends upon the iron contents of the raw material. Chilling may be achieved by admixing with the chlorination gases an inert cooling liquid evaporating within the mixing temperature range. For instance, a liquid metal halide, a liquified chlorination residual gas or liquid chlorine may be used. When chilling by means of a metal halide it is advisable to employ titanium tetrachloride. The evaporating liquid thereby absorbs at least part of the heat content of the gases released between the initial mixing temperature and the temperature after cooling. The other part of the heat is lost by the gases due to radiation of the cooling equipment. Using large equipment, however, the amount of the evaporating liquid may be adjusted so that it will absorb more than 50% and up to 90% of the heat content of the gases necessary to obtain the desired reduction in temperature. The temperature of the liquid, of course, must be lower than the temperature after cooling. The amount of the liquid added is calculated in such a manner that the initial condensation temperature of the easily volatilized solid metal chlorides, such as ferric chloride and zirconium tetrachloride, is not reached. This precaution is necessary in order to prevent precipitation of these chlorides in a finely divided form. When chlorination gases are chilled or rapidly cooled to temperatures below the condensation point of the normally solid metals, such as ferric chloride, by the vaporization of added liquid coolants, the metal chloride is condensed in such finely divided particles that it becomes very difficult if not impossible to remove these solids per se from the gaseous mixture.

If the concentration of the iron in the ore is very high it may be advisable to add a small amount of chlorine gas to the gaseous mixture obtained by the chlorination immediately after the chlorination. This will help prevent the undesired dissociation. Thereafter the gases are chilled by the addition of an inert liquid coolant, preferably titanium tetrachloride.

It is, of course, also possible to combine the addition of chlorine with the chilling process by chilling the chlorination product by a simultaneous admixture of a cooling liquid and chlorine. Chilling may also be accomplished by admixing a liquid containing chlorine dissolved therein, e. g. a solution of chlorine in titanium tetrachloride.

In the second step the gases are further cooled by the admixture of a gas which is substantially cooler (generally at least 50° C.) than the partially cooled chlorination gases. A temperature is thereby reached which is near the lowest point of the range of temperatures within which condensation of the solid metal chlorides present in said chlorination gases takes place, but which is always slightly higher (1° C. or preferably 5° to 10° C. or more) than the dew point of the liquid metal chlorides present in the gases. The temperature of the colder gas to be added therefore must be lower than the temperature to be reached. In order to avoid adding too large amounts of gas the temperature of the added gas should be preferably at least 20° C. lower than the desired temperature of the mixture. The added colder gas absorbs at least part of the latent heat of condensation of the precipitating solid chlorides and at least part of the heat content of the gases released between the temperature before and after the condensation. The other part of the heat is lost by radiation from the condensing equipment. It is not necessary to condense substantially all of the solid chloride by the direct cooling action of the colder gas; after having precipitated part of the solid chlorides by the admixture of the gas, the remaining part may be condensed by indirect cooling. However, the amount of cooling gas should be adjusted to condense at least 50% and preferably 80 to 95% of the solid chlorides. Thereafter the precipitated solid metal chlorides are removed from the gases and then the liquid metal chlorides are condensed.

By the admixture of such a cooling gas precipitation of the solid chlorides on surfaces such as the walls of the apparatus, is prevented and yet it is possible to obtain the chlorides in a coarse form which can be removed easily from the gases.

After the admixture of the cooling gas with the chlorination gases, it is advantageous to allow sufficient time for the development of large crystals of the normally solid metal chloride. A retention time of about 10 seconds or slightly more is usually sufficient for the development of the desired large crystals which afterwards are easily removed from the gas.

The admixture of a cooling inert gas with the chlorination gases has the further advantage that the difference between the initial condensation temperature of the solid metal chloride and the dew point of the liquid metal chlorides is affected only to a very small extent. If, for instance, a gas inert to the chlorination gases is added, such as carbon monoxide, carbon dioxide, nitrogen, or a chlorination gas from which the solid and the liquid metal chlorides have been largely removed, the initial condensation temperature of the solid chlorides as well as the dew points of the liquid chlorides are decreased in about the same proportion. Although the admixture of such a return gas represents a preferred means of carrying out this process, it is, of course, also possible to make use of a chlorination gas which is freed at least of all its contents of condensable solid metal chlorides while it still contains at least part of its content of titanium tetrachloride in vapor form. The temperature of such a gas to be returned into the process must, of course, be above the dew point of the titanium tetrachloride contained in it. In this case, naturally, the initial temperature of condensation of the solid chloride only is decreased while the dew point of the titanium tetrachloride remains approximately constant. But also here the difference in the points of precipitation of the normally solid and normally liquid metal chlorides is still large enough so as to achieve good separation.

The greatest advantage obtained by admixing the inert gases resides in the fact that the cooling process can be carried out quite safely even in large scale productions. The danger that the liquid metal chlorides will precipitate together with the solid metal chlorides is very small in this process. It actually does not exist at all when cooling with a return gas which still contains titanium tetrachloride in vapor form. The admixture of the gas requires careful adjusting of the gas current (e. g. with rotameters) and careful regulating of its temperature (e. g. with a thermostat); but these adjustments can be made with rather simple devices. Thus the process can be controlled quite easily.

The amount of liquid titanium tetrachloride used for chilling the chlorination gases in the first stage of the process depends on the composition of the gases, the exit temperatures of these gases from the furnace and on the initial point of condensation of the normally solid chlorides. The condensation point of the normally solid metal chlorides depends on the concentration of the solid chlorides in the gas. The temperature of the liquid $TiCl_4$ and the heat loss of the equipment have to be considered too.

According to the chemical equation $$TiO_2 + 2C + 2Cl_2 \rightarrow TiCl_4 + 2CO \quad (1)$$

a chlorination gas is produced containing about ⅓ by volume of $TiCl_4$. In practice, however, the gas contains more or less of $TiCl_4$ due to side reactions. In the first place, there is formed in addition to CO a certain amount of $CO_2$ according to the chemical equation $$TiO_2 + C + 2Cl_2 \rightarrow TiCl_4 + CO_2 \quad (2)$$

About 5–10% of the $TiO_2$ reacts at temperatures of about 800° C. according to the second equation. Further the hydrogen contained in the carbon forms HCl. The formation of ferric chloride, zirconium tetrachloride and other foreign chlorides effects a further decrease in the concentration of $TiCl_4$. For an exact determination of the amount of $TiCl_4$ to be added the exact composition of the gases has to be considered.

As a rough guide, however, the maximum required amount of $TiCl_4$ will be given below for different concentrations of $TiCl_4$ and $FeCl_3$ and/or $ZrCl_4$, and a furnace exit temperature of 800° C.

TABLE 1

[Amount of $TiCl_4$ in kg./h. for cooling a chlorination gas of 800° C. down to about 10° C. above initial condensation point of solid chlorides for a chlorination rate of 100 kg. $TiCl_4$/h.]

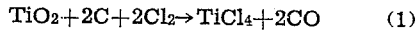

| $TiCl_4$ of 20° C. required kg./h. | $TiCl_4$ concentration in gas, vol. percent before chilling | $FeCl_3$ concentration in gas, gr./m.³ | $ZrCl_4$ concentration in gas, gr./m.³ | approximate temperature after chilling, ° C. |
|---|---|---|---|---|
| 170 | 30 | 20  | --- | 200 |
| 160 | 30 | 75  | --- | 220 |
| 140 | 25 | 375 | --- | 250 |
| 135 | 30 | 750 | --- | 265 |
| 165 | 30 | --- | 30  | 210 |
| 150 | 30 | --- | 100 | 230 |
| 165 | 30 | 20  | 30  | 210 |
| 160 | 30 | 75  | 100 | 220 |

The concentration of solid chloride is calculated on total volume of gas reduced to normal temperature and pressure. Practically, however, the amount of $TiCl_4$ will be considerably less because the heat loss of the spray tower.

Similarly the amount of return gas which has to be added during the second step depends on several factors, such as the composition of the gas, the temperature of the gas to be cooled and the temperature of the gas to be added, the amount of solid chloride which will condense, and also on the heat loss of the equipment.

In the illustrative embodiments discussed before wherein cooling was effected with liquid $TiCl_4$, the dew point of $TiCl_4$ will be between 100 and 120° C. after the chilling process is completed. By adding cold return gas from which most of the titanium tetrachloride has been condensed and removed, this dew point will be decreased further.

The following table will give a rough picture of how much cold return gas has to be added for precipitating out more than 95% of the iron chloride and/or zirconium tetrachloride. The quantities again are based on a chlorination rate of 100 kg. $TiCl_4$/h. In the table, "A" represents gas temperature in °C. before adding gas; "B" represents percent by volume of $TiCl_4$ concentration before adding gas; "C" represents $FeCl_3$ concentration before adding gas, in gr./m.³; "D" represents $ZrCl_4$ concentration before adding gas, in gr./m.³; "E" represents added amount of return gas 20° C. m.³/h. N. T. P.; "F" represents temperature of mixture in °C.; "G" represents dew point of $TiCl_4$ in °C.; "H" represents percent of solid chloride condensed at temperature of mixture.

TABLE 2

| A | B | C | D | E | F | G | H |
|---|---|---|---|---|---|---|---|
| 200 | 55 | 15  | --  | 55  | 150 | 90 | 95 |
| 220 | 55 | 50  | --  | 75  | 150 | 85 | 97 |
| 250 | 50 | 250 | --  | 75  | 180 | 80 | 96 |
| 265 | 45 | 500 | --  | 115 | 180 | 75 | 98 |
| 210 | 55 | --  | 20  | 85  | 140 | 85 | 95 |
| 230 | 50 | --  | 65  | 85  | 160 | 85 | 95 |
| 210 | 55 | 15  | 20  | 85  | 140 | 85 | 95 |
| 230 | 55 | 50  | 65  | 85  | 160 | 85 | 95 |

It is not necessary to add an amount of the cooling gas sufficient to precipitate 95% of the chloride. One can add also a lower amount to precipitate only e. g. 80% or less of the chlorides by the direct cooling action of the gas and then precipitate thereafter the remaining part by indirect cooling. Since the gases after the admixture of the cooling gas are full of suspended crystals, the solid chlorides which condense out by further indirect cooling will condense for the most part on the suspended crystals. The amount of cooling gas added should at least be sufficient to precipitate about 50% of the solid chlorides by direct cooling.

Instead of cold or room temperature return gas one can add also warm return gas which still contains the vaporous titanium tetrachloride. For example, a gas containing 15 gr./m.³ $FeCl_3$, a $TiCl_4$ concentration of 55% by volume and having a temperature of 200° C. produced by chlorinating a titaniferous material at the rate of 100 kg./h. of $TiCl_4$ and being rapidly cooled from about 800° C. to 200° C. by injecting about 170 kg. of liquid $TiCl_4$ is further cooled to 150° C. by adding 100 m.³/h. by volume (calculated for N. T. P.) of return gas of 120° C. which still contains 55% by volume of $TiCl_4$ vapor. In this way about 95% of the $FeCl_3$ is condensed and can afterwards be removed. After the precipitate is removed, the gas is further cooled to 120° which is still above the dew point of $TiCl_4$ and part of it is returned to precipitate the $FeCl_3$, the remaining part being led to the $TiCl_4$ condenser.

A suitable apparatus for practicing the process of this invention is illustrated diagrammatically in the attached drawing.

As shown in the drawing, 1 is a chlorinator wherein titanium containing materials are charged into the top thereof and chlorine is fed into the side near the bottom and ash is removed from the bottom. The chlorination gases flow from the chlorinator to a dust separator 2 which removes ore and coal dust from the stream of chlorination gases. The chlorination gases flow from the dust separator 2 through a conduit into chilling tower 4. The conduit between dust separator 2 and chilling tower 4 is provided with a conduit 3 for the introduction of chlorine into the hot chlorination gases. Tower 4 is provided with a conduit and spray nozzle 5 for the introduction of an inert liquid, advantageously TiCl4, to cool the chlorination gases to a point near to but above the condensation point of its least volatile solid metal chloride content. From tower 4, the gases flow into condensation tower 6 provided with annular channel 7 for the introduction and admixture of colder inert gases, preferably return gases. The chlorination gases are retained in cooling tower 6 for a period of time sufficient for the formation of large crystals of such normally solid metal chlorides as iron and zirconium chlorides. The gases containing the crystals of normally solid chlorides now flow into electrofilter 8 which serves to remove the condensed solid chlorides. If desired, another condenser (not shown) may be inserted to cool the gases further by direct or indirect means and thereby condense additional normally solid chlorides on the seed crystals. The gases substantially freed of normally solid chlorides now flow into a condenser 9 where the normally liquid metal chlorides such as titanium tetrachloride are condensed. After the condensation of the titanium tetrachloride part of the residual gases which may be partially or completely freed of normally solid and normally liquid metal chlorides are recycled by means of fan 12 and conduit 13 to assist in the precipitation of the normally solid metal chlorides. Such recycled gases are usually at room or lower temperatures.

If desired, part of the chlorination gases may be drawn off before the removal of the titanium tetrachloride but after the removal of the solid condensates by means of fan 10 and cooled in a cooling tower 11 to a temperature near to but above the dew point of titanium tetrachloride and afterwards reintroduced into the cooling tower 6 to facilitate the condensation of the normally solid metal chlorides. The cooling of the return gases in cooler 11 may be carried out indirectly, for instance by means of cool pipes, or directly, for instance by injecting titanium tetrachloride into the gases. Likewise the preferred liquid titanium tetrachloride introduced into cooling tower 4 may be recycled from condensation tower 9.

The following three examples further illustrate the practice of the present invention but are not to be considered limitations thereupon.

*Example 1*

In a chlorinator such as illustrated in the drawing 130 kgs. of briquettes consisting of 100 kgs. of rutile (containing 96% of $TiO_2$, 1% of FeO, 1% of $ZrO_2$, 0.8% of $V_2O_5$, and 1.2% of $SiO_2$) and 30 kgs. of coke are chlorinated within an hour at 800–900° C. The chlorination gases consisting of about 30% by volume of $TiCl_4$, 50–60% of CO, 5–10% of $CO_2$, 5–10% of HCl, and about 1% (calculated on $TiCl_4$ volume) each of $FeCl_3$, $ZrCl_4$ and $VOCl_3$ are freed of dust in cyclone separator 2 and flow therefrom at a temperature of 750–800° C. into chilling tower 4. In chilling tower 4 having a height of 3.00 meters and a diameter of 0.80 meter, the gas flowing from the cyclone separator is cooled to about 300° C. by injecting 230 kg./h. of liquid titanium tetrachloride of 20° C., advantageously obtained from condenser 9, whereby the titanium tetrachloride is completely vaporized. The gases then are fed to the second cooling tower or condenser 6, having a height of 4 meters and a diameter of 0.90 meter where about 300 m.³/h. of return gas of 20° C. from conduit 13 is introduced through the annular channel 7. The temperature of the resulting mixture of gases will be about 150° C. but due to the heat loss through the walls of tower 6 the temperature will drop to about 120° C. The gases are retained about 15 seconds in tower 6 so that large crystals of $FeCl_3$ and $ZrCl_4$ will be formed. The gases are now fed to electrofilter 8 which is kept at about 120° C., for example, by a steam jacket, where substantially all of the condensed solid chloride entering with the gases is eliminated. About 4 kg./h. of a solid chloride mixture consisting of 50 to 60% $FeCl_3$ and 40 to 50% $ZrCl_4$ is recovered in condenser 6 and separator 8, which is more than 95% of the total quantities of these chlorides originally present. The dust free gases then are led to the condenser 9 where the titanium tetrachloride is condensed at about 20° C. After the condensation, part of the gas is fed back through conduit 13 to the cooling tower 6 and the other part of the gas is advantageously led to a deep cooler maintained at about −20° C. to recover the part of $TiCl_4$ which remained in the gases. About 200 kg./h. of $TiCl_4$ containing most of the silicon and vanadium of the rutile dissolved as chlorides is recovered in this manner.

*Example 2*

One hundred parts of a rutile ore containing 96% of $TiO_2$, 1% of $ZrO_2$, 1% of FeO, and 2% of $SiO_2$, are converted into briquettes by means of 40 parts of coke and 10 parts of pitch. The briquettes are calcined in a reducing atmosphere at a temperature of 800° to 1000° C. and are then chlorinated in chlorinating furnace 1 at a temperature of 900° C. The furnace is charged with 180 kgs. of briquettes per hour. The crude gases consisting of about 30% by volume of $TiCl_4$, 50 to 60% of CO, 5 to 10% of $CO_2$, 5 to 10% of HCl, about 1% (calculated on $TiCl_4$) of $ZrCl_4$, and about 1% of $FeCl_3$, flow from the furnace at a temperature of 850° C. and are freed of coal and ore dust in the cyclone separator 2. The hot gases leave separator 2 at a temperature of about 800° C. and are led into spray tower 4 in which they are cooled to about 250° C. by injecting about 300 kg./h. of liquid $TiCl_4$ at a temperature of 20° C. Thereafter the gases are introduced into the top of cooling tower 6 (0.90 meter in diameter and 4.00 meters in effective height). About 650 m.³/h. of a return gas containing titanium tetrachloride vapors are introduced into cooling tower 6 through the annular channel 7 at a temperature of 110° C. Through the cooling effect of the return gas and by the heat loss of the tower 6 the gas mixture reaches a temperature of about 140° C. The gases are retained in tower 6 a sufficient period of time to permit crystal growth. By this procedure about 95% of the iron and zirconium chlorides precipitate. The condensed solid chlorides are subsequently removed from the gases by a dust separator, such as the electrofilter 8, which is kept at a temperature of 140° C. by a suitable device such as a heat jacket. One fourth of the remaining gases are passed into the condenser 9 in which the titanium tetrachloride is condensed while the other three fourths are drawn off by the fan 10 and are cooled in the cooler 11 to a temperature of 110° C. The cooled gases are then introduced into the second cooling tower 6 as stated above.

Example 3

Titanium oxide slag consisting of about 71.5% TiO₂, 10.5% FeO and several per cent of other oxides such as SiO₂, MgO are chlorinated in the same apparatus as described in Example 1. One hundred parts of the slag are briquetted with 30 parts of petroleum coke and 10 parts of pitch and then calcined.

One hundred kg./h. of briquettes containing about 75 kgs. of slag are charged into the chlorinator at a temperature of 800° C. Preheated chlorine is introduced at a temperature of 900° C. The reaction takes place at about 800° C. and a chlorination gas containing 26% by volume of $TiCl_4$ and about 300 gr. of $FeCl_3/m.^3$ gas calculated for normal temperature is obtained. Immediately after discharge from chlorinator 2 at a temperature of 800° C. the gases are admixed with about 1 kg./h. of chlorine gas through conduit 3 (the cyclone 2 being left out) thereby adjusting a concentration of free chlorine in the gas to about 0.5% by volume. Then the gases are fed to the tower 4 into which 130 kg./h. of liquid $TiCl_4$ are sprayed. The gases are thereby cooled down to 250° C. The gases now having a concentration of about 225 gr. of $FeCl_3/m.^3$ are fed to tower 6 having a diameter of 1.50 meters and a height of 3.00 meters. About 150 m.³/h. of cold return gas (20° C.) are fed to tower 6. The temperature of the gas mixture is about 160° C. but heat loss from the surface of the cooling tower 6 reduces the temperature to about 140° C. About 16 kg. of $FeCl_3$ are condensed, about two thirds of which are recovered in the tower 6, and one third in the electrofilter 8 which is kept at 140° C. with the aid of a steam jacket. The gases leaving the Cottrell contain less than 1 gr./m.³ of $FeCl_3$. The $TiCl_4$ is condensed in the condenser 9, then the gases are divided into two parts, one flowing back to the cooling tower 6, the other part preferably to a deep cooler (not shown).

This application is a continuation-in-part of my copending applications, Serial Numbers 151,-244 and 151,245, the latter of which is now abandoned, both filed March 22, 1950.

While the present invention has been described with particular reference to the treatment of gaseous mixtures containing titanium tetrachloride, certain other normally liquid, certain normally solid, and certain normally gaseous chlorides, it is not limited thereto. The invention may be applied to the treatment of vapors containing various other halides such as the bromides and fluorides as produced by the high temperature halogenation of oxidic metalliferous materials in the presence of a reducing agent. The general principles of this invention are especially applicable to the separation of ferric chloride and certain other unstable metal chlorides from other normally liquid metal chlorides, such as the chlorides of titanium tetrachloride, but is also applicable to the separation of other unstable metal halides from gaseous mixtures of normally liquid metal halides or such mixtures containing more volatile gases.

The practice of this invention has been exemplified in the specification by various details and examples. It will be understood, however, that these details may be varied widely and that substitutions, additions, or omissions can be made without departing from the spirit or the scope of the invention which is intended to be defined by the appended claims.

What is claimed is:

1. In the processing of hot gases produced by the chlorination of oxidic metalliferous material in the presence of carbonaceous reducing material and containing in vapor state at least one normally liquid metal chloride and at least one normally solid metal chloride including a substantial amount of ferric chloride, the steps which comprise passing the gases into one cooling zone while their temperature exceeds the dissociation temperature range of the ferric chloride vapor and therein rapidly cooling them through said range to a temperature slightly above the condensation temperature of the ferric chloride and maintaining all of said chlorides in the vapor state and the ferric chloride in the ferric state, predominantly by mixing with said gases a volatile liquid at a temperature below about 200° C. and in a quantity completely vaporized by the heat of said gases, said liquid being selected from the group consisting of volatile liquid halides, liquid chlorine and liquefied chlorination gases; then passing the gases into another cooling zone and therein cooling them to a temperature slightly above the dew point of the normally liquid metal chloride vapors, predominantly by mixing with the gases a cooling gas inert thereto, thereby condensing most of the normally solid metal chloride content in a dry and readily separable form; separating the condensed normally solid chloride in the dry state; then further cooling the gases and condensing and separating liquid metal chlorides from them.

2. In the processing of hot gases produced by the chlorination of oxidic metalliferous material in the presence of carbonaceous reducing material and containing in vapor state at least one normally liquid metal chloride and at least one normally solid metal chloride including a substantial amount of ferric chloride, the steps which comprise passing the gases into one cooling zone while their temperature exceeds the dissociation temperature range of the ferric chloride vapor and therein rapidly cooling them through said range to a temperature slightly above the condensation temperature of the ferric chloride and maintaining all of said chlorides in the vapor state and the ferric chloride in the ferric state, predominantly by mixing with said gases a volatile liquid chloride consisting principally of titanium tetrachloride at a temperature below about 200° C. and in a quantity completely vaporized by the heat of said gases; then passing the gases into another cooling zone and therein cooling them to a temperature slightly above the dew point of the normally liquid metal chloride vapors, predominantly by mixing with the gases a cooling gas inert thereto, thereby condensing most of the normally solid metal chloride content in a dry and readily separable form; separating the condensed normally solid chloride in the dry state; then further cooling the gases and condensing and separating liquid metal chlorides from them.

3. In the processing of hot gases produced by the chlorination of oxidic metalliferous material in the presence of carbonaceous reducing material and containing in vapor state at least one normally liquid metal chloride and at least one normally solid metal chloride including a substantial amount of ferric chloride, the steps which comprise passing the gases into one cooling zone while their temperature exceeds the dissociation temperature range of the ferric chloride vapor and therein rapidly cooling them through said range to a temperature slightly above the condensation temperature of the ferric chloride and maintaining all of said chlorides in the vapor state and the ferric chloride in the ferric state, predominantly by mixing with said gases a volatile liquid at a temperature below about 200° C. and in a quantity completely vaporized by the heat of said gases, said liquid being selected from the group consisting of volatile liquid halides, liquid chlorine and liquefied chlorination gases; then passing the gases into another cooling zone and therein cooling them to a temperature slightly above the dew point of the normally liquid metal chloride vapors, predominantly by mixing with the gases a cooling gas inert thereto, thereby condensing most of the normally solid metal chloride content in a dry and readily separable form; separating the condensed normally solid chloride in the dry state; then further cooling the gases and condensing and separating liquid metal chlorides from them; returning a part of the condensed liquid metal chloride into said one cooling zone as the coolant for further inflowing chlorination gases; and returning a part of the gases remaining after said liquid chloride separation into said other cooling zone as the cooling gas for further gases inflowing from said one zone.

4. In the processing of hot gases produced by the chlorination of oxidic metalliferous material in the presence of carbonaceous reducing material and containing in vapor state at least one normally liquid metal chloride and at least one normally solid metal chloride including a substantial amount of ferric chloride, the steps which comprise passing the gases into one cooling zone while their temperature exceeds the dissociation temperature range of the ferric chloride vapor and therein rapidly cooling them through said range to a temperature slightly above the condensation temperature of the ferric chloride and maintaining all of said chlorides in the vapor state and the ferric chloride in the ferric state, in the presence of a small amount of added chlorine and predominantly by mixing with said gases a volatile liquid at a temperature below about 200° C. and in a quantity completely vaporized by the heat of said gases, said liquid being selected from the group consisting of volatile liquid halides, liquid chlorine and liquefied chlorination gases; then passing the gases into another cooling zone and therein cooling them to a temperature silghtly above the dew point of the normally liquid metal chloride vapors, predominantly by mixing with the gases a cooling gas inert thereto, thereby condensing most of the normally solid metal chloride content in a dry and readily separable form; separating the condensed normally solid chloride in the dry state; then further cooling the gases and condensing and separating liquid metal chlorides from them.

5. In the processing of hot gases produced by the chlorination of oxidic titaniferous material in the presence of carbonaceous reducing material and containing in vapor state normally liquid and normally solid metal chlorides including titanium tetrachloride and a substantial amount of ferric chloride, the steps which comprise rapidly cooling the gases in one zone from a temperature above 700° C. to a temperature above the highest condensation temperature of their ferric chloride content but not substantially above 300° C., predominantly by mixing with said gases volatile liquid metal chloride consisting principally of titanium tetrachloride, in an amount completely vaporized by the heat of the gases; then passing the gases into another zone and therein cooling them to a temperature slightly above the dew point of the normally liquid metal chloride vapors, predominantly by mixing with them a relatively cool gaseous by-product of such gases from which at least a part of the metal chlorides has been removed, thereby condensing most of the normally solid metal chloride content in a dry and readily separable form; separating the condensed normally solid chloride in the dry state; then further cooling the gases and condensing and separating from them liquid metal chloride consisting principally of titanium tetrachloride.

6. In the processing of hot gases produced by the chlorination of oxidic titaniferous material in the presence of carbonaceous reducing material and containing in vapor state normally liquid and normally solid metal chlorides including titanium tetrachloride and a substantial amount of ferric chloride, the steps which comprise rapidly cooling the gases in one zone from a temperature above 700° C. to a temperature above the highest condensation temperature of their ferric chloride content but not substantially above 300° C., predominantly by mixing with said gases volatile liquid metal chloride consisting principally of titanium tetrachloride, in an amount completely vaporized by the heat of the gases; then passing the gases into another zone and therein cooling them to a temperature slightly above the dew point of the normally liquid metal chloride vapors, predominantly by mixing with them a relatively cool gaseous by-product of such gases from which condensable normally solid chlorides and at least a major part of the normally liquid chlorides have been removed, thereby condensing most of the normally solid metal chloride content in a dry and readily separable form; separating the condensed normally solid chloride in the dry state; then further cooling the gases and condensing and separating from them liquid metal chloride consisting principally of titanium tetrachloride.

7. In the processing of hot gases produced by the chlorination of oxidic titaniferous material in the presence of carbonaceous reducing material and containing in vapor state normally liquid and normally solid metal chlorides including titanium tetrachloride and a substantial amount of ferric chloride, the steps which comprise rapidly cooling the gases in one zone from a temperature above 700° C. to a temperature above the highest condensation temperature of their ferric chloride content but not substantially above 300° C., predominantly by mixing with said gases volatile liquid metal chloride consisting principally of titanium tetrachloride, in an amount completely vaporized by the heat of the gases; then passing the gases into another zone and therein cooling them to a temperature slightly above the dew point of the normally liquid metal chloride vapors, predominantly by mixing with them a relatively cool gaseous by-product of such gases from which condensable normally solid chlorides and at least a major part of the normally liquid chlorides have been removed, thereby condensing most of the normally solid metal chloride content in a dry and readily separable form; separating the condensed normally solid chloride in the dry state; then further cooling the gases and condensing and separating from them liquid metal chloride consisting principally of titanium tetrachloride; returning a part of the condensed liquid metal chloride into said one cooling zone as the coolant for further inflowing chlorination gases; and returning a part of the gases remaining after said liquid chloride separation into said other cooling zone as the cooling gas for further gases inflowing from said one zone.

References Cited in the file of this patent

UNITED STATES PATENTS

| Number | Name | Date |
|---|---|---|
| 1,478,750 | McElroy | Dec. 25, 1923 |
| 2,245,358 | Pechukas | June 10, 1941 |
| 2,306,184 | Pechukas | Dec. 22, 1942 |
| 2,311,466 | Pechukas | Feb. 16, 1943 |

FOREIGN PATENTS

| Number | Country | Date |
|---|---|---|
| 550,750 | Great Britain | Jan. 22, 1943 |

OTHER REFERENCES

J. W. Mellor's Inorganic and Theoretical Chemistry, vol. 14, page 41, Longmans, Green & Co., N. Y.